(12) United States Patent
Thomas et al.

(10) Patent No.: US 6,834,636 B2
(45) Date of Patent: Dec. 28, 2004

(54) SINGLE-ENDED BARREL ENGINE WITH DOUBLE-ENDED, DOUBLE ROLLER PISTONS

(75) Inventors: Charles Russell Thomas, Covington, LA (US); Bret R. Hauser, Flower Mound, TX (US); David P. Branyon, San Antonio, TX (US)

(73) Assignee: Thomas Engine Company, Covington, LA (US)

( * ) Notice: Subject to any disclaimer, the term of this patent is extended or adjusted under 35 U.S.C. 154(b) by 0 days.

(21) Appl. No.: 10/426,547

(22) Filed: Apr. 29, 2003

(65) Prior Publication Data

US 2004/0035385 A1 Feb. 26, 2004

Related U.S. Application Data

(63) Continuation-in-part of application No. 10/263,264, filed on Oct. 2, 2002, now Pat. No. 6,662,775, which is a continuation-in-part of application No. 10/021,192, filed on Oct. 30, 2001, now Pat. No. 6,698,394, and a continuation-in-part of application No. 09/937,543, filed as application No. PCT/US00/07743 on Mar. 22, 2000.
(60) Provisional application No. 60/377,011, filed on Apr. 30, 2002, provisional application No. 60/377,072, filed on Apr. 30, 2002, provisional application No. 60/377,053, filed on Apr. 30, 2002, provisional application No. 60/376,638, filed on Apr. 30, 2002, provisional application No. 60/244,349, filed on Oct. 30, 2000, provisional application No. 60/252,280, filed on Nov. 21, 2000, provisional application No. 60/260,256, filed on Jan. 8, 2001, provisional application No. 60/261,060, filed on Jan. 11, 2001, provisional application No. 60/267,598, filed on Feb. 9, 2001, provisional application No. 60/125,798, filed on Mar. 23, 1999, provisional application No. 60/134,457, filed on May 17, 1999, provisional application No. 60/141,166, filed on Jun. 25, 1999, provisional application No. 60/147,584, filed on Aug. 6, 1999, and provisional application No. 60/326,857, filed on Oct. 3, 2001.

(51) Int. Cl.$^7$ ............... F02B 57/00; F02B 53/00; F02B 75/18; F02B 75/06
(52) U.S. Cl. ............... 123/241; 123/43 A; 123/43 AA; 123/78 A
(58) Field of Search .............. 123/43 A, 43 AA, 123/78 R, 78 A, 78 B, 78 BA, 78 D, 241, 247

(56) References Cited

U.S. PATENT DOCUMENTS 2,118,804 A     5/1938   Andersen ............ 123/58

(List continued on next page.)

FOREIGN PATENT DOCUMENTS

DE     3408447 A1    9/1985

(List continued on next page.)

OTHER PUBLICATIONS

Stanglmaier R., Ryan T. and Souder J., "HCCI Operation of a Dual–Fuel Natural Gas Engine for Improved Fuel Efficiency and Ultra–Low NOx Emissions at Low to Moderate Engine Loads", 2001, SAE Paper 2001–01–1897.

(List continued on next page.)

Primary Examiner—Sheldon Richter
(74) Attorney, Agent, or Firm—Gifford, Krass, Groh, Sprinkle, Anderson & Citkowski, PC

(57) ABSTRACT

An internal combustion barrel engine includes an engine housing with a first and second end. An elongated power shaft is longitudinally disposed in the engine housing and defines a longitudinal axis. A combustion cylinder and a guide cylinder are spaced apart and disposed on a common cylinder axis that is generally parallel to the central axis. The cylinders each have an inner end and an outer end, with the inner ends being closer to each other. The outer end of the combustion cylinder is closed. An intake system is operable to introduce a mixture of air and/or fuel into the combustion cylinder. A track is supported between the inner ends of the cylinders and has an undulating cam surface. The track is moveable such that the portion of the cam surface most directly between the cylinders undulates toward and away from the inner end of the combustion cylinder. A double-ended piston includes a combustion end disposed in the combustion cylinder so as to define a combustion chamber between the combustion end and the closed end of the combustion cylinder. A guide end is disposed in the guide cylinder. A midportion extends between the combustion end and the guide end and is in mechanical communication with the guide surface of the track. A variable compression ratio device is operable to move the track axially towards and away from the inner end of the combustion cylinder so as to adjust the compression ratio. Combustion occurs only in the combustion cylinder and does not occur in the guide cylinder.

23 Claims, 8 Drawing Sheets

U.S. PATENT DOCUMENTS

| | | | | |
|---|---|---|---|---|
| 6,435,145 B1 | * | 8/2002 | Said | 123/56.1 |
| 6,662,775 B2 | * | 12/2003 | Hauser | 123/241 |
| 6,698,394 B2 | * | 3/2004 | Thomas | 123/241 |

FOREIGN PATENT DOCUMENTS

| | | | |
|---|---|---|---|
| EP | 0 093 822 | 11/1983 | ........... F02B/57/10 |
| FR | 20203 | 10/1899 | |
| FR | 416364 | 10/1910 | |
| FR | 433357 | 1/1912 | |
| FR | 6424291 | 7/1927 | |
| FR | 711040 | 9/1931 | |
| FR | 2 557 659 | 7/1985 | ........... F16H/25/12 |
| FR | 2 566 460 | 12/1985 | ........... F02B/75/26 |
| FR | 2 707 700 | 1/1995 | ........... F02B/75/32 |
| GB | 113711 | 3/1918 | |
| GB | 377877 | 8/1932 | |
| JP | 55-23308 | 2/1980 | ............ F01B/3/04 |
| JP | 580183825 | 10/1983 | ........... F02B/75/26 |
| WO | WO 92/09798 | 6/1992 | ........... F02B/75/04 |
| WO | WO 92/09799 | 6/1992 | ........... F02B/75/04 |
| WO | WO 98/07973 | 2/1998 | ............ F02M/7/00 |
| WO | WO 00/57044 | 9/2000 | ........... F02B/57/08 |

OTHER PUBLICATIONS

"Engine Smoothness", 2000, www.fortunecity.com/silverstone/lancia/58/technical_school/engine/smoot.

"Reciprotating Combustion Engine", 2001, http://reciprotating.com/default.htm.

"Homogeneous–Charge Compression Ignition Stratified Charge Compression Ignition Engine Laboratory", 2000, http://www.ca.sandia.gov.

"SVD—A Unique Engine Concept", Feb. 2000, http://www.saab.com/home/GLOBAL/en/pressreleases.xml.

"Dynamics of the Swash Plate Mechanism" 1984, Proceedings of the 19845 Inter Compressor Engineering Conference.

"New Engine Excites Many in Auto Industry", 1998, http://www.detnews.com/1998/autos/9805/20/052001.htm.

Kawabata, Y., Nakagawa K. and Shoji, F., "Operating Characteristics of Natural Gas Fueled Homogeneous Charge Compression Ignition", 1998, Annual Technical Report Digest.

"Dyna–Cam Revolutionary Engine Design", 2001, http://www.dynacam.com.

Christensen, M., Johansson, B., and Einewall, P., "Homogeneous Charge Compression Ignition (HCCI) using isooctane, ethanol, and Natural Gas. A Comparison wiht Spark–Ignition Operation", 1997, SAE Paper 972874.

Hultqvist, A., Christensen, M., and Johansson, P., "A Study of the Homogeneous Charge Compression Ignition Combustion Process by Chemiluminescence Imaging", 1999, SAE Paper 1999–01–3680.

Gray A. and Ryan T., "Homogeneous Charge Compression Ignition (HCCI) of Diesel Fuel", 1997, SAE Paper 971676.

Ziph B. and Meijer R., "Variable Stroke Power Control for Stirling Engines", 1981, SAE Paper 810088.

Clucas D.M. and Raine J.K., "A New Wobble Drive with Particular Application in a Stirling Engine", 1994, IMechE vol. 208.

Kontarakis G., Collings N. and Ma T., "Demonstration of HCCI Using Single–Cylinder, Four–stroke SI Engine with Modified Valve Timing", 2000 SAE 2000–01–2870.

Pucher G., Gardener D., Bardon M. and Battista, V., "Alternative Combustion Systems for Piston Engines Involving Homogeneous Charge Compression Ignition Concepts—A Review of Studies Using Methanol, Gasoline, and Diesel Fuel", 1996, http://www.bcresearch.com.

Gill G.S. and Freudenstein F., "Minimization of Inertia–Induced Forces in Spherical Four–bar Mechanisms. Part 2: Wobble–Plate Engines", 1983, ASME.

Gill, G.S. and Freudenstein F., "Minimization of Inertis–Induced Forces in Spherical Four–bar Mechanisms. Part 1: The General Spherical Four–bar Linkage", 1983, ASME vol. 105/471.

Hardenberg H. and Buhl H., "The Mercedes–Benz Om 403 VA—A Standard Production, Compression–Ignition, Direct–Injection Multifuel Engine", 1982, SAE Paper 820028.

Hiroshi T. and Masaharu H., "Historical Review of the Wobbleplate and Scroll Type Compressors", 1990, SAE Paper 901737.

Li J., Chae J., Lee S. and Jeong J., "Modeling the Effects of Split Injection Scheme on Soot and NOx Emissions of Direct Injection Diesel Engines by a Phenomenological Combustion Model", 1996, SAE Paper 962062.

McLanahan J., "Barrel Aircraft Engines: Historical Anomaly or Stymied Innovation", 1998, SAE Paper 985597.

Olsson J., Erlandsson O. and Johansson B. "Experiments and Simulation of a Six–Cylinder Homogeneous Charge Compression Ignition (HCCI) Engine", 2000, SAE Paper 2000–01–2867.

"Erickson MCC FE–120", 1001, www.ericksonmotors.com/fe–120.htm.

Miyagawa K. and Kayukawa H., "Development of the Swash Plate–Type Continuously Variable Displacement Compressor", 1998, SAE Paper 980290.

Sadashivappa K., Singaperumal M. and Narayanasamy K., "On the Efficiency of the Axial Piston Motor Considering Piston Form Deviations", 1995, Pergamon 0957–4158 (95) 00074–7.

Edge K.A. and Darling j., "The Pumping Dynamics of Swash Plate Piston Pumps", 1989, ASME vol. 111/307.

Thieme L. and Allen D., "Testing of a Variable–Stroke Stirling Engine", 1986, 21st Intersociety Energy Conversion Engineering Conference, Paper 869104.

Thieme L., "Initial Testing of a Variable STroke Stirling Engine", 1985, U.S. Dept. of Energy, NASA TM–86875.

Au M., Girard J. and Hiltner J., "Homogeneous Charge Com;pression Ignition", 2001 http://www.me.berkeley.edu/~mctai/hcci.html.

Christensen M., Hultqvist A. and Johansson B., "Demonstrating the Multi–Fuel Capability of a Homogeneous Charge Compression Ignition with Variable Compression Ratio", 1999, SAE Paper 1999–01–3679.

Christensen M. and Johansson B., "Influence of Mixture Quality on Homogeneous Charge Compression Ignition", 1998, SAE Paper 982454.

Christensen M., Johansson B., Amneus P., and Mauss F., "Supercharged Homogeneous Charge Compression Ignition (HCCI)", 1998, SAE Paper 980787.

Kraft M., Maigaard P. and Mauss F., "Homogeneous Charge Compression Ignition Engine: A Simulation Study on the Effects of Inhomogeneities", 2000, ASME 2000 Spring Technical Conference.

Kraft M., Maigaard P., Mauss F. and Christensen M., "Investigations of Combustion Emissions in a HCCI Engine Measurements and a New Computational Model 2000 28th International Symposium for Combustion", 4E12.

Maricq M., Munoz R., Yang J. and Anderson R., "Sooting Tendencies in an Air Forced Direct Injection Spark–Ignition (DISI) Engine", 2001, SAE Paper 2001–01–0255.

Manring N., "Slipper Tipping within an Axial–Piston Swash–Plate Type Hydrostatic Pump", 1998, ASME FPST–vol. 5.

Jinqu N., Fukai I. and Kurihara M., "The Development of a Fixed–displacement Single–sided Swash Plate a/c Compressor", 2001, SAE Paper 2001–01–0971.

Kaahaaina N., Simon A., Caton P. and Edwards C., "Use of Dynamic Valving to Achieve Residual–Affected Combustion", 2000, SAE Paper 2001–01–0549.

Stanglmaier R. and Robert C., "Homogeneous Charge Compression Ignition (HCCI): Benefits, Compromises, and Future Engine Applications", 1999, SAE Paper 19999–01–3682.

Thring R., "Homogeneous Charge Compression Ignition (HCCI) Engines", 1989, SAE Paper 892068.

Fiveland S., and Assanis D., "A Four–Stroke Homogeneous Charge Compression Ignition Engine Stimulation for Combustion and Performance Studies", 2000, SAE Paper 2000–01–0332.

Nishimura T., Umeda T., Tsuta T. and Fujiwara, M., "Dynamic Response Analysis of a Swash Plate Type Hydraulic Piston Pump", 1995, ASME/JSME Pressure Vessels and Piping Conference PVP–vol. 300.

Sheiretov T., Glabbeek W. and Cusano C., Simulative Friction and Wear Study of Retrofitted Swash Plate and Rolling Piston Compressors, 1995.

Taya T., Kobayashi H., Kawaguchi M. and Inagaki M. "10PC20 Swash Plate Type Variable Displacement Compressor for Automobile Air Conditioners", 1992, SAE Paper 920260.

Ryan T. and Callahan T. "Homogeneous Charge Compression Ignition of Diesel Fuel", 1996, SAE Paper 961160.

Tsuta T., Iwamoto T. and Umeda T. "Combined Dynamic Response Analysis of a Piston–Slipper System and Libricants in Hydraulic Piston Pump", 1999, ASME PVP vol. 396.

Zhang X., Cho J., Nair S., Manring N., "Damping on the Swash Plate of an Axial–Piston Pump 2000", 2000, American Control Conference.

"New Saab and Citroen Technology at Geneva", Automotive Engineering Online, SAE International, May 2000.

Herling, D., Smith, M., Baskaran, S., and Kupe J., "Application of Non–Thermal Plasma Assisted Catalyst Technology for Diesel Emission Reduction", 2000, SAE Paper 2000–01–3088.

Law, D., Kemp, D., Allen, J., Kirkpatrick, G., and Copland, T., "Controlled Combustion in an IC–Engine with a Fully Variable Valve Train", 2001, SAE Paper 2000–01–0251.

"Advanced Engine Technologies' OX2 Engine Poised as Alternative for Future World Energy Needs", Press Release, Thursday, Feb. 8, 4:34 p.m. Eastern Time (http://biz.yahoo.com/prnews/010208/ca_advance_4.html).

"Advanced Engine Technologies Unveils New Web Site", Press Release, Monday, Mar. 12, 12:00 p.m. Eastern Time (http://biz.yahoo.com/prnews/010312/lam013_2.html).

* cited by examiner

US 6,834,636 B2

SINGLE-ENDED BARREL ENGINE WITH DOUBLE-ENDED, DOUBLE ROLLER PISTONS

CROSS-REFERENCE TO RELATED APPLICATIONS

This application is a continuation-in-part of the following patent applications: U.S. patent application Ser. No. 10/021,192, filed Oct. 30, 2001, now U.S. Pat. No. 6,698,394 and U.S. patent application Ser. No. 10/263,264, filed Oct. 2, 2002, now U.S. Pat. No. 6,662,775. This application also claims priority from U.S. Provisional Patent Applications Ser. No. 60/377,011, filed Apr. 30, 2002; No. 60/377,072, filed Apr. 30, 2002; No. 60/377,053, filed Apr. 30, 2002; and No. 60/376,638, filed Apr. 30, 2002.

U.S. patent application Ser. No. 10/021,192, in turn, claims priority from U.S. Provisional Patent Application Ser. No. 60/244,349, filed Oct. 30, 2000; No. 60/252,280, filed Nov. 21, 2000; No. 60/260,256, filed Jan. 8, 2001; No. 60/261,060, filed Jan. 11, 2001; and No. 60/267,598, filed Feb. 9, 2001; and is a continuation-in-part of U.S. patent application Ser. No. 09/937,543, filed Sep. 26, 2001, now abandoned, which is a U.S. National Phase of PCT/US00/07743, filed Mar. 22, 2000, which claims priority from U.S. Provisional Patent Application Ser. No. 60/125,798, filed Mar. 23, 1999; No. 60/134,457, filed May 17, 1999; No. 60/141,166, filed Jun. 25, 1999, and No. 60/147,584, filed Aug. 6, 1999.

U.S. patent application Ser. No. 10/263,264, in turn, claims priority from U.S. Provisional Patent Application Ser. No. 60/326,857, filed Oct. 3, 2001, and is a continuation-in-part of U.S. patent application Ser. No. 09/937,543, filed Sep. 26, 2001, now abandoned, which is a U.S. National Phase of PCT/US00/07743, filed Mar. 22, 2000, which claims priority from U.S. Provisional Patent Application Ser. No. 60/125,798, filed Mar. 23, 1999, No. 60/134,457, filed May 17, 1999, No. 60/141,166, filed Jun. 25, 1999, and No. 60/147,584, filed Aug. 6, 1999.

The content of all of the above-identified U.S., PCT and provisional patent applications are incorporated herein by reference in their entirety.

FIELD OF THE INVENTION

The present invention relates to the use of double-ended, double roller pistons in single-ended barrel engines.

BACKGROUND OF THE INVENTION

An engine with the ability to vary its compression ratio during operation can significantly improve efficiency and power density for compression-ignited (CI), stoichiometric spark-ignited (SSI), homogeneous charge compression-ignited (HCCI) and lean combustion spark-ignited (LCSI) applications. Variable compression ratio (VCR) abilities allow an engine's compression ratio to be lowered during high load conditions to prevent detonation or to limit peak cylinder pressure and allow the compression ratio to be raised to improve thermal efficiency at lower load conditions. Variable compression ratio can also be used to phase or supplement the phasing of combustion in homogeneous charge compression engines and to broaden the range of air-fuel ratio that can be used in lean combustion spark-ignited engines. In nearly all engine applications, variable compression ratio is especially beneficial when used in combination with supercharging, where the combination of variable compression ratio and supercharging substantially multiplies the benefits of both features.

In spite of their benefit and applications, engines with variable compression ratio abilities have not been used in commercial applications due to issues of extreme complexity, lack of long-term durability and prohibitively high costs. Several approaches to varying compression ratio in conventional slider-crank engines have been proposed and in some cases have been implemented. One type of variable compression ratio device for use in slider-crank engines is shown in the following publications: PCT Publication No. WO 92/09798, PCT Publication No. WO 92/09799, U.S. Pat. No. 5,329,893; and U.S. Pat. No. 5,443,043, all of which are assigned to Saab. The Saab design includes a traditional in-line slider-crank engine in which the head and cylinder bank are tilted to vary compression ratio. The design preferably also includes an external supercharger for providing boost air to the engine. Using stoichiometric spark-ignition, the Saab variable compression ratio engine has demonstrated a 30% improvement in fuel economy in combined city and highway driving cycles. In spite of its benefits, Saab's pivoting head design is cumbersome and complex, has potential sealing issues and is prohibitively expensive. Other attempts to vary compression ratio in conventional slider-crank engines are generally inferior to the Saab technique for various reasons.

Another means of varying compression ratio in slider-crank engines is achieved through variable valve timing. Variable valve timing is a very good technology for extending an engine's torque curve over a broad range of engine speed and for some Miller cycle variable compression ratio applications. However, the usefulness of variable valve timing for other variable compression ratio applications is very limited. Varying compression ratio with variable valve timing relies on decreasing the effective stroke of the engine to lower compression ratio. This results in significant penalties in the effective displacement of the engine as compression ratio is lowered. In nearly all variable compression ratio applications, compression ratio must be lowered when peak power is needed. A reduction in the effective engine displacement at this time significantly reduces the peak power capability of the engine and usually offsets any benefits that can be gained by a varying compression ratio.

In contrast to conventional slider-crank engines, single-ended barrel engines by nature provide a structure that is better suited to utilize a simple and effective means of varying compression ratio. The engine structure of a single-ended barrel engine allows the engine's compression ratio to be easily and simply varied by axially changing the position of the engine's central track or cam drive mechanism. By moving the track axially, the pistons can be brought closer to or further away from top dead center (TDC), thus, varying the engine's compression ratio. This method of varying compression ratio is both durable and inexpensive and is more effective than variable valve timing methods of varying compression ratio in most applications.

A single-ended barrel engine design is also advantageous because it allows piston motion to be independently optimized for the intake, compression, combustion and exhaust cycles. This level of optimized piston motion is not possible in slider-crank engines, which are restricted to sinusoidal piston motion or in double-ended barrel engines, which cannot independently optimize piston motion for each cycle.

While single-ended barrel engines provide a simple and inexpensive means of varying compression ratio and the ability independently optimize piston motion for various engine cycles, prior art single-ended barrel engines with these abilities have yet to demonstrate a piston structure that is both structurally and kinematically feasible at normal engine speeds. Prior art single-ended barrel engines employ single-ended or double-ended, single roller piston designs that lack critical crosshead and roller support qualities needed for a feasible design.

SUMMARY OF THE INVENTION

The present invention provides improvements to barrel engines by mating the simplified variable compression ratio and optimized piston motion abilities of a single-ended barrel engine with a rigid and durable crosshead piston design. A unique double-ended, double roller piston is employed that uses one end for combustion and the other end as a crosshead guide means to reduce side loading on the piston. In some embodiments, the barrel engine includes a variable compression ratio device, while in other embodiments it includes an integral supercharger. In still other embodiments, the engine includes a non-sinusoidal cam surface, which causes the combustion ends of the pistons to move non-sinusoidally. In some embodiments, these features are used in combination with one another.

In one embodiment, the internal combustion barrel engine includes an engine housing with a first end and a second end. An elongated power shaft is longitudinally disposed in the engine housing and defines a longitudinal axis of the engine. A combustion cylinder and a guide cylinder are spaced apart and disposed on a common cylinder axis that is generally parallel to the central axis. The cylinders each have an inner end and an outer end, with the inner ends being closer to each other. The outer end of the combustion cylinder is closed. An intake system is operable to introduce a mixture of air and/or fuel into the combustion cylinder. A track is supported between the inner ends of the combustion cylinder and the guide cylinder. The track has an undulating cam surface. The track is moveable such that the portion of the cam surface most directly between the inner ends of the cylinders undulates toward and away from the inner end of the combustion cylinder. A double-ended piston includes a combustion end moveably disposed in the combustion cylinder such that a combustion chamber is defined between the combustion end of the piston and the closed end of the combustion cylinder. A guide end of the piston is moveably disposed in the guide cylinder. A midportion of the piston extends between the combustion end and the guide end. The midportion is in mechanical communication with the guide surface of the track such that as the track moves, the midportion urges the combustion end of the piston outwardly within the combustion cylinder to compress the mixture in the combustion chamber and allows the combustion end of the piston to move inwardly within the combustion chamber as the mixture within the combustion chamber expands. The guide end moves with the midportion such that as the combustion end moves outwardly, the guide end moves inwardly in the guide cylinder, and as the combustion end moves inwardly, the guide end moves outwardly. The guide end and the guide cylinder cooperate to guide the motion of the double-ended piston. A variable compression device is operable to move the track axially towards and away from the inner end of the combustion cylinder so as to adjust the compression ratio. Combustion occurs only in the combustion cylinder and does not occur in the guide cylinder.

In one alternative embodiment, the guide end of the piston is a pumping end and the guide cylinder is a pumping cylinder with a closed outer end. The pumping end and the pumping cylinder cooperate to compress a gas. The engine further includes a valve assembly for providing the gas to the pumping cylinder and venting compressed gas from the pumping cylinder. A compressed gas conduit is in fluid communication with the valve assembly and the intake system such that the compressed gas from the pumping cylinder is provided to the combustion chamber so as to supercharge the engine.

In another embodiment of the present invention, a barrel engine includes an engine housing with a first end and a second end. An elongated power shaft is longitudinally disposed in the engine housing and defines a longitudinal axis of the engine. A combustion cylinder and a guide cylinder are spaced apart and disposed on a common cylinder axis that is generally parallel to the central axis. The cylinders each have an inner end and an outer end with the inner ends being closer to each other. The outer end of the combustion cylinder is closed. An intake system is operable to introduce a mixture of air and/or fuel into the combustion cylinder. A track is supported between the inner ends of the combustion cylinder and the guide cylinder. The track has an undulating cam surface. The track is moveable such that the portion of the cam surface most directly between the inner ends of the cylinders undulates toward and away from the inner end of the combustion cylinder. The undulating cam surface defines a non-sinusoidal shape. A double-ended piston includes a combustion end moveably disposed in the combustion cylinder such that a combustion chamber is defined between the combustion end of the piston and the closed end of the combustion cylinder. A guide end of the double-ended piston is moveably disposed in the guide cylinder. A midportion extends between the combustion end and the guide end. The midportion is in mechanical communication with the cam surface of the tracks such that as the track moves, the midportion urges the combustion end of the piston outwardly within the combustion cylinder to compress the mixture in the combustion chamber and allows the combustion end of the piston to move inwardly within the combustion cylinder as the mixture within the combustion chamber expands. The motion of the piston is non-sinusoidal. The guide end moves with the midportion such that as the combustion end moves outwardly, the guide end moves inwardly in the guide cylinder and as the combustion end moves inwardly, the guide end moves outwardly. The guide end and the guide cylinder cooperate to guide the motion of the double-ended piston. Combustion occurs only in the combustion cylinder and does not occur in the guide cylinder.

In an alternative embodiment, the engine further includes a variable compression ratio device operable to move the track axially towards and away from the inner end of the combustion cylinder so as to adjust the compression ratio. In yet a further alternative embodiment, the guide end of the piston comprises a pumping end and the guide cylinder comprises a pumping end and the guide cylinder comprises a pumping cylinder with a closed outer end. The pumping end and the pumping cylinder cooperate to compress a gas. The engine further comprises a valve assembly for providing a gas to the pumping cylinder and venting compressed gas from the pumping cylinder. A compressed gas conduit is in fluid communication with the valve assembly and the intake system such that the compressed gas from the pumping cylinder is provided to the combustion chamber so as to supercharge the engine.

DETAILED DESCRIPTION OF THE INVENTION

Figure 1:
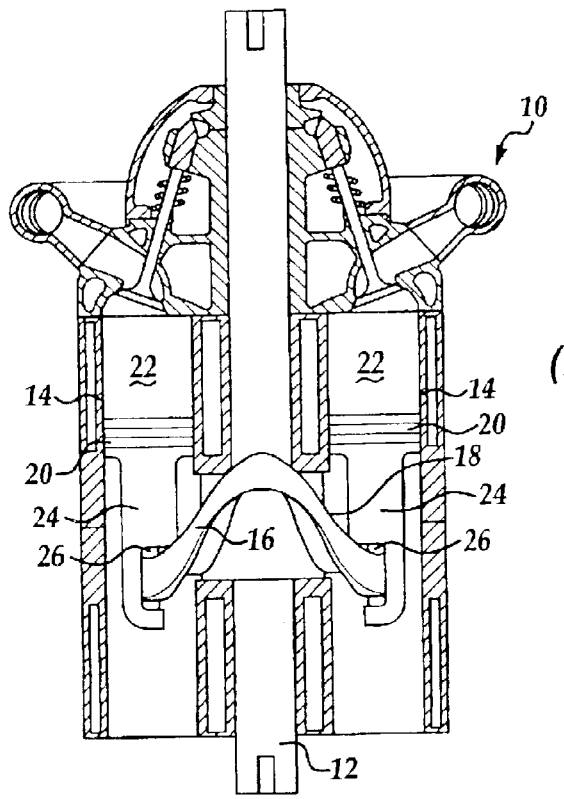
FIG. 1 is a cross-sectional view of a prior art single-ended barrel engine.

A single-ended barrel engine design presents a unique opportunity to vary compression ratio by simple and inexpensive means, and to optimize piston motion. A single-ended barrel engine is one that contains only one central track for driving piston motion, with the combustion event occurring on only one side of the track and one end of the engine. This configuration is less complicated than opposing piston and double-ended barrel engine designs and provides an engine structure that allows the engine's compression ratio to be easily and simply varied by axially changing the position of the track. A single-ended barrel engine design also allows piston motion to be independently optimized for the intake, compression, combustion and exhaust cycles because power is produced on only one side of the track. FIG. 1 illustrates an example of a single-ended barrel engine.

The engine 10 in FIG. 1 is merely representative of the general configuration of an engine referred to herein as a barrel engine. It includes a drive or power shaft 12 with a plurality of cylinders 22 arranged about the power shaft 12. Single cylinder variations are also possible. The central axis of each of the cylinders 14 may be generally parallel to the power shaft 12. Alternatively, the axes of the cylinders 14 may be tilted slightly outwardly or inwardly with respect to the power shaft 12. A track or cam plate 16 is preferably connected to the power shaft 12 such that the two rotate in unison. The track 16 surrounds and extends outwardly from the power shaft 12 and has an undulating cam surface 18. As the power shaft 12 is rotated about its longitudinal axis, the surface 18 of the track 16 undulates closer to and farther from the cylinders 14. Pistons 20 are moveably positioned in the cylinders 14 and define a combustion chamber 22 between each piston and the upper end of its respective cylinder 14. The pistons 20 are interconnected with the track 16 such that as the track rotates, the pistons are caused to reciprocate within the cylinders 14. In the embodiment illustrated in FIG. 1, the pistons have a crown portion that faces the combustion chamber and a lower end with rollers 26 that ride on the undulating surface 18 of the track 16.

As will be clear to those of skill in the art, as the power shaft 12 rotates and the pistons 20 reciprocate within their respective cylinders, the various strokes of a combustion cycle can be defined. The cam surface 18 of the track 16 may have a generally sinusoidal shape, thereby corresponding to the standard sinusoidal reciprocal motion typical of a crank driven piston. Alternatively, the surface of the track may be non-sinusoidal in order to optimize piston motion for the intake, compression, combustion and exhaust strokes. The track is generally disposed in a plane perpendicular to the power shaft and the cam surface is generally disposed at a constant distance from the axis of the power shaft.

In the field of single-ended barrel engines, there are a few designs in which one or more pistons are attached to one another by a rigid or hinged means. It should be noted that this application refers to single-ended barrel engines in which each piston unit is free to reciprocate independently from other pistons within the engine. It should also be noted that the single-ended barrel engines discussed are assumed to include a drive means consisting of a wobble, swash, wave-cam, or similar lobed cam or angled plate device. One type of engine within this class of single-ended barrel engines is the type illustrated in FIG. 1.

In the development of the present invention it was found that double-ended, double roller pistons are preferred in order to accept the side load from the roller to cam surface interface while also keeping reciprocating mass to a minimum. Double-ended pistons are advantageous in that they provide a rigid crosshead guide mechanism that is lighter than other types of guide strategies used in barrel engines. In barrel engines, extremely careful design considerations must be made to minimize piston mass in order to limit Hertzian contact stress at the roller to cam surface interface. In the development of the present invention it was determined that double-ended, double roller pistons were the preferred type of piston design that is both rigid enough and light enough to provide a competitive engine speed range in a barrel engine.

Figure 2:
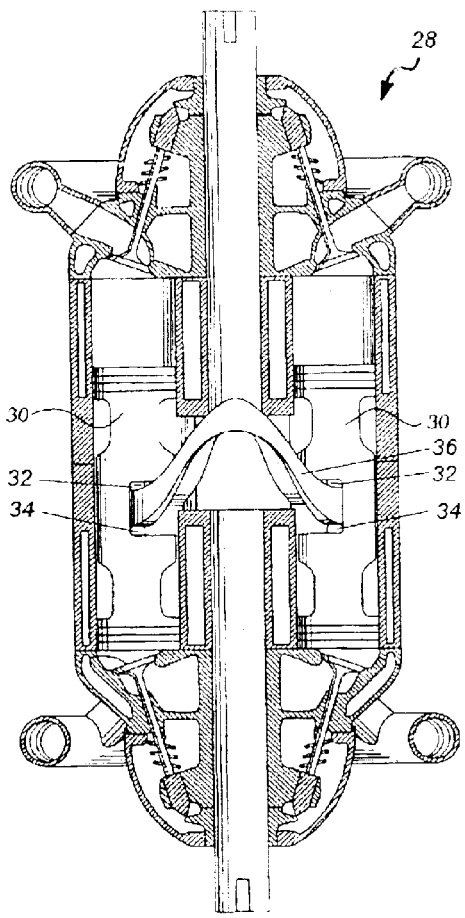
FIG. 2 is a cross-sectional view of a prior art double-ended barrel engine.

FIG. 2 illustrates a double-ended barrel engine utilizing double-ended, double roller pistons 30. This type of double-ended piston includes upper 32 and lower 34 rollers that interface with a cam track 36. Double-ended barrel engines differ from single ended barrel engines because they have firing events on both ends of the engine and to both sides of the cam track. Unlike prior art single-ended barrel engines, in order to allow firing events on both ends of the engine, double-ended barrel engines typically employ double-ended pistons. Another double-ended barrel engine, using double-ended, double roller pistons, is shown in U.S. Pat. No. 4,492,188 to Palmer et al.

U.S. Pat. No. 1,867,504 to Franklin illustrates a barrel engine using an alternative type of double-ended piston design in which a single roller travels within a cam-like grove in the drive means. While this type of double-ended piston provides desirable crosshead features, it does not provide sufficient support for both ends of the roller. In the extreme environment of an internal combustion engine, variations of this single-roller design will not be capable of sustaining normal engine speeds. The design of the double-ended, double roller pistons illustrated in FIG. 2, however, has been proven in running double-ended barrel engines and in a multitude of double-ended compressors. The success of these devices serves as testimony to the benefit of double-ended, double roller piston designs.

Double-ended pistons work well in double-ended barrel engines. However, because double-ended barrel engines must consider firing events on both ends of the engine, they cannot vary compression ratio by axially changing the position of the central cam drive means. If this method of varying compression ratio is attempted in a double-ended barrel engine, as compression ratio is increased on one end of the engine by moving the drive means axially toward that end, it is reduced on the other end, and vice versa. What is beneficial to one end of the engine is detrimental to the other. This relationship prevents the most simplified means of varying compression ratio from being used in double-ended barrel engines, making it equally difficult to vary compression ratio in double-ended barrel engines as it is to vary compression ratio in slider-crank engines.

Problems are also encountered when attempts are made to independently optimize piston motion for the intake, compression, combustion and exhaust cycles in a double-ended barrel engine. These problems again result from the need to consider firing events on opposite ends of the engine. In a double-ended barrel engine with double-ended pistons, when one end of a piston is traveling away from its respective top dead center (TDC), the other end is traveling toward its respective top dead center. Therefore, for example, when one end of the piston is traveling away from top dead center during a power cycle, the other end must be traveling toward its respective top dead center during either a compression or an exhaust cycle. This is true for each of the operating cycles such that it is not possible to optimize each cycle independently for both ends the engine.

The present invention is unique in part because it uses double-ended, double roller pistons of the general type illustrated in FIG. 2, but only uses one end of the pistons for combustion and the other end to provide a rigid crosshead guide means. Since combustion only occurs on one side of the piston, the engine does not have to consider firing on an opposite end of the engine. This allows the present invention to mate the simplified variable compression ratio and optimized piston motion abilities of a single-ended barrel engine with a rigid and durable double-ended, double roller crosshead piston design.

Figure 3:
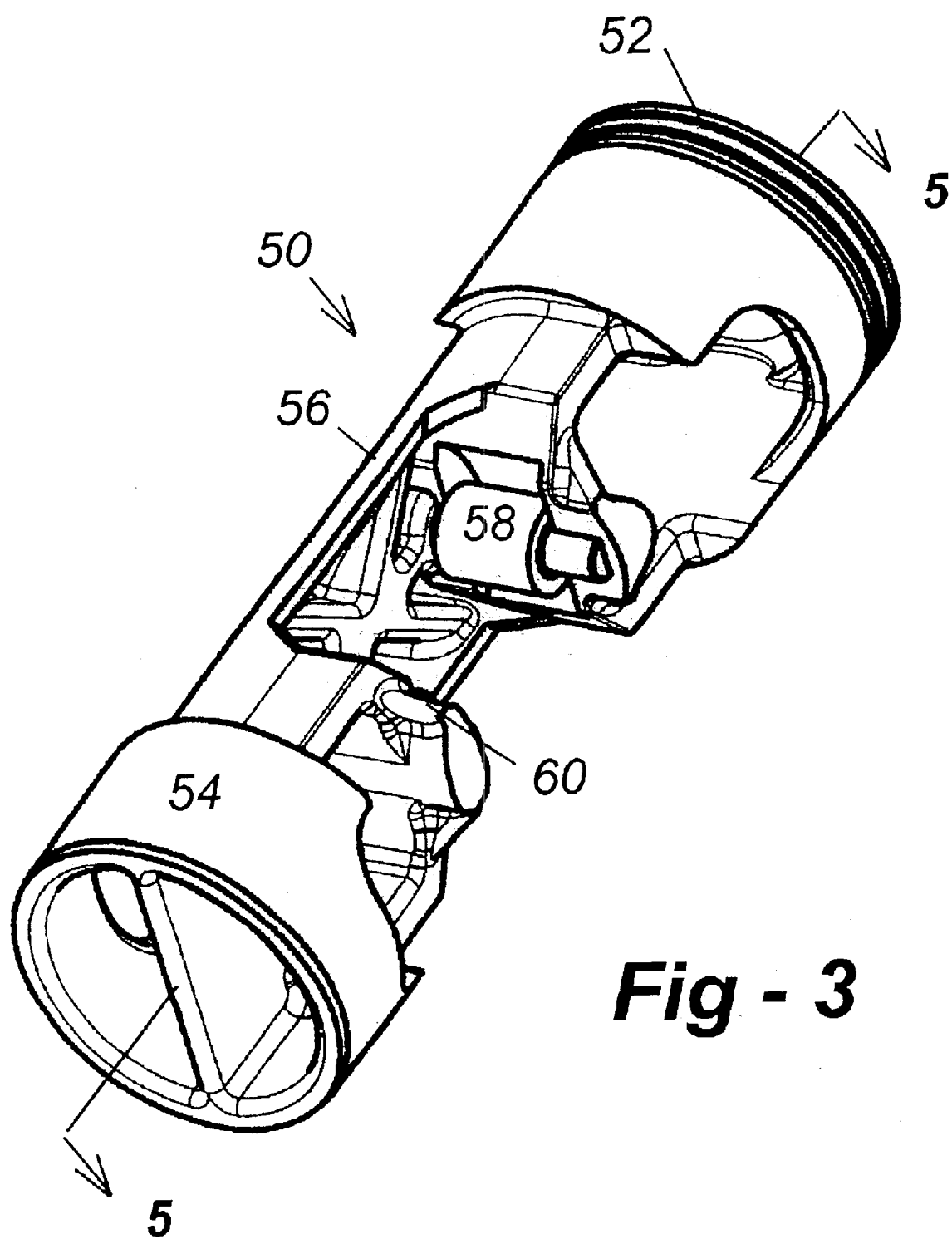
FIG. 3 is a perspective view of a first embodiment of a double-ended piston for use with the present invention.
Figure 4:
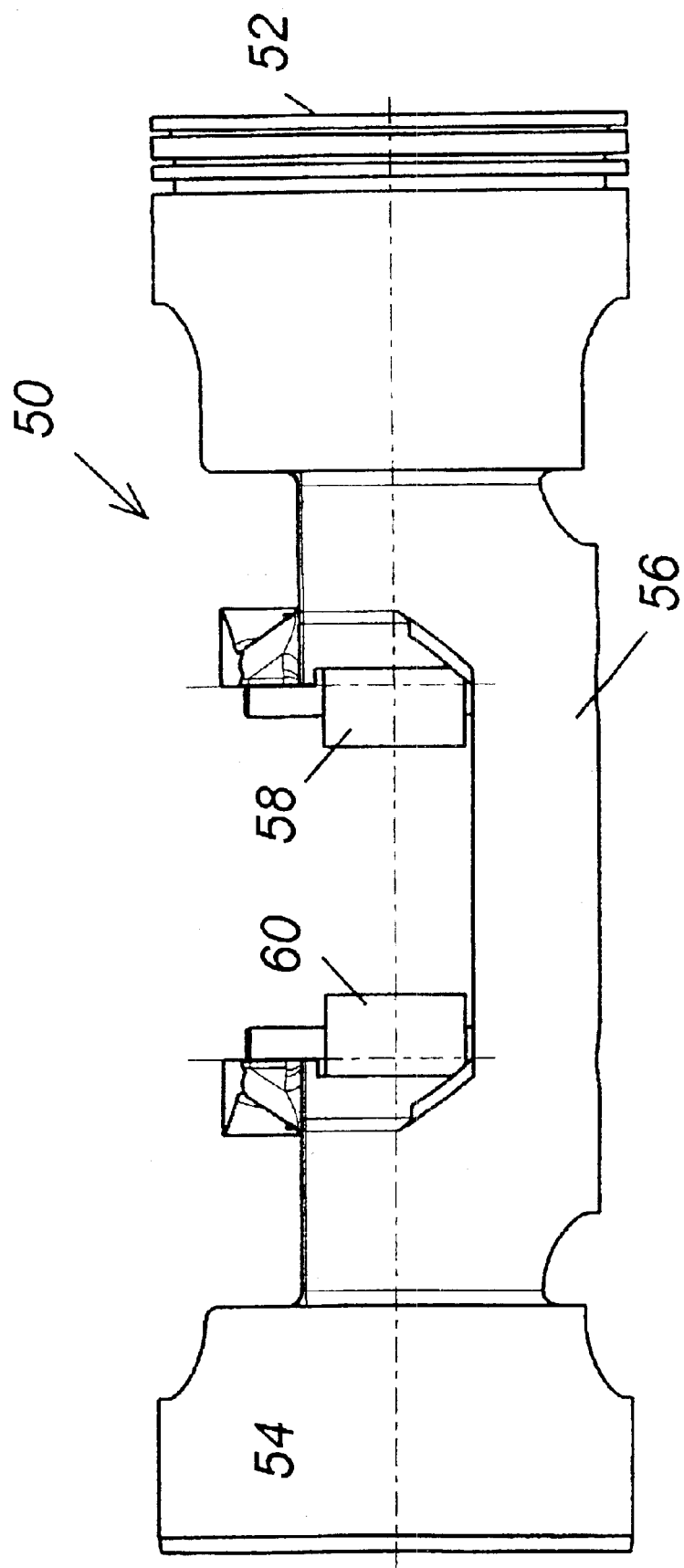
FIG. 4 is a side view of the piston of FIG. 3.
Figure 5:
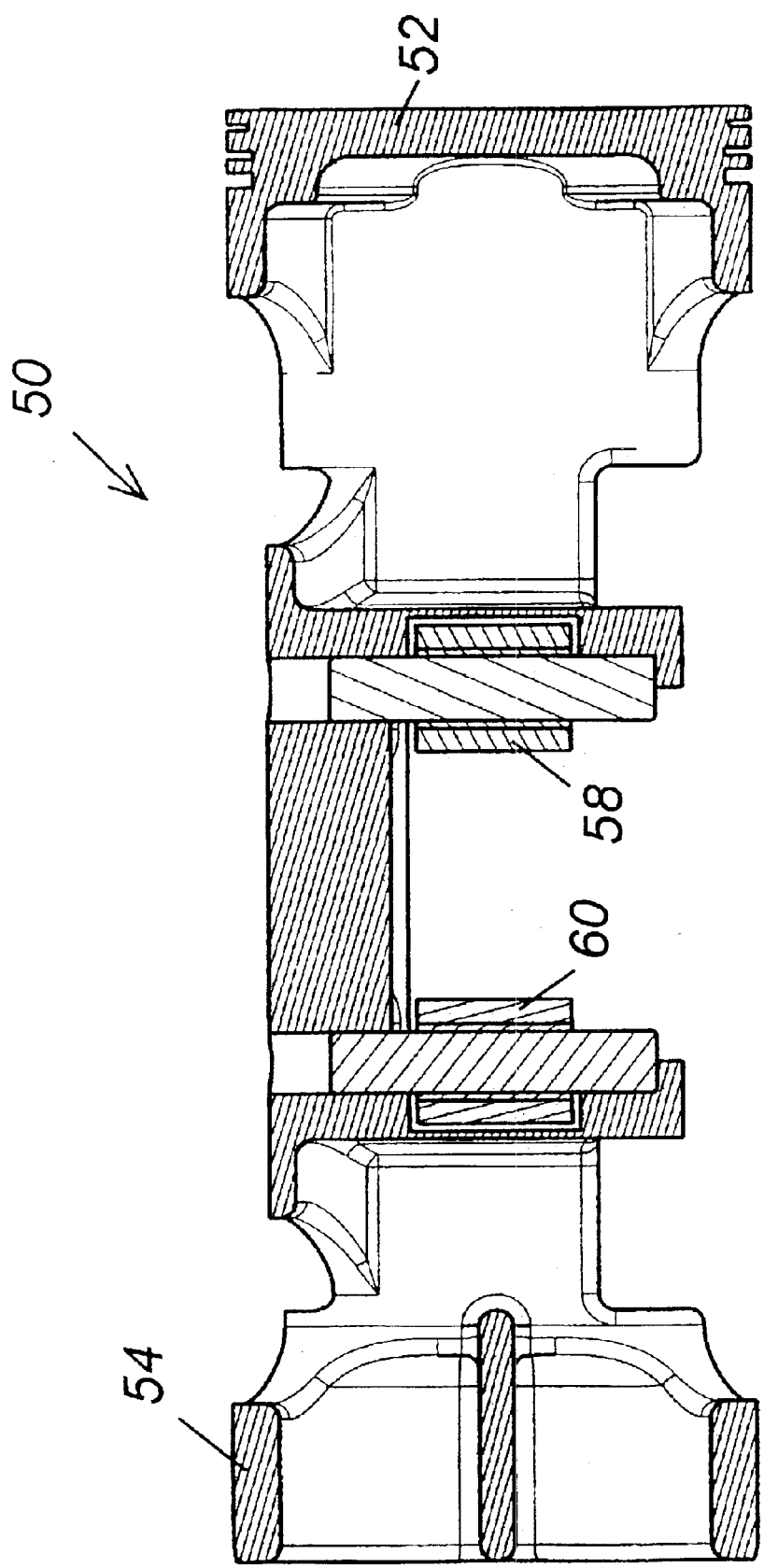
FIG. 5 is a cross-sectional view of the piston of FIG. 3, taken along lines 5—5.

FIGS. 3–5 illustrate a double-ended, double roller piston, as modified in the present invention to operate in a single-ended barrel engine with combustion acting on only one end of the piston. The piston 50 has a combustion end 52, which would be received in a combustion cylinder, and an opposite guide end 54, which would be received in a guide cylinder. As shown, the combustion end 52 is configured like a typical piston, with a closed upper crown portion that includes piston ring grooves for receiving rings. The guide end 54 may be open, as shown, or configured in other ways. The piston 50 has a midportion 56 interconnecting the combustion end 52 and guide end 54. The midportion 56 has a pair of opposed rollers 58 and 60, which engage upper and lower cam surfaces of a track in a barrel engine. The mid portion may be constructed such that it is in sliding contact with the outer edge of the track in order to prevent undesired rotation of the piston about its longitudinal axis. Other anti-rotation designs may also be utilized. In some designs, oil galleries may be included to provide pressurized lubrication to the roller pins. The rollers 58 and 60 are illustrated as hollow rollers with a pin extending therethrough. Preferably, the rollers and pins may instead be integrally formed. Alternatively, two or more side-by-side rollers may share a pin, so as to reduce the scrubbing due to slight variations in linear speed on the inside and outside of the cam surface.

The various parts of the piston may be either cast or forged, either separately or as a single unit, or formed in any other way known to those of skill in the art. Preferably, the piston 50 is unitarily formed such that the ends 52 and 54, and midportion 56, are integrally formed and rigid with respect to one another. In some designs, it will be preferable for the crown portions of the piston to be formed separately and welded to the main body of the piston using an electron beam or attached by various other means that will be familiar to those of skill in the art. The diameter of the combustion end 52 and guide end 54 may differ from one another or may be the same. Also, the ends are not required to have circular perimeters, but may instead have different shapes. For purposes of the present invention, a cylinder that receives a piston may have a shape other than strictly cylindrical. For example, it may be somewhat rectangular or oval in shape, and still fall within the meaning of "cylinder," as used herein.

Unlike the single-ended pistons or double-ended, single roller pistons found in prior art single-ended barrel engines, the modified double-ended, double roller pistons, used in the present invention retain the critical crosshead and roller support qualities of a double-ended, double roller piston, yet still allow compression ratio to be easily varied and piston motion to be easily optimized. Therefore, the present invention provides a better variable compression ratio engine platform and a better platform for optimizing piston motion.

Figure 6:
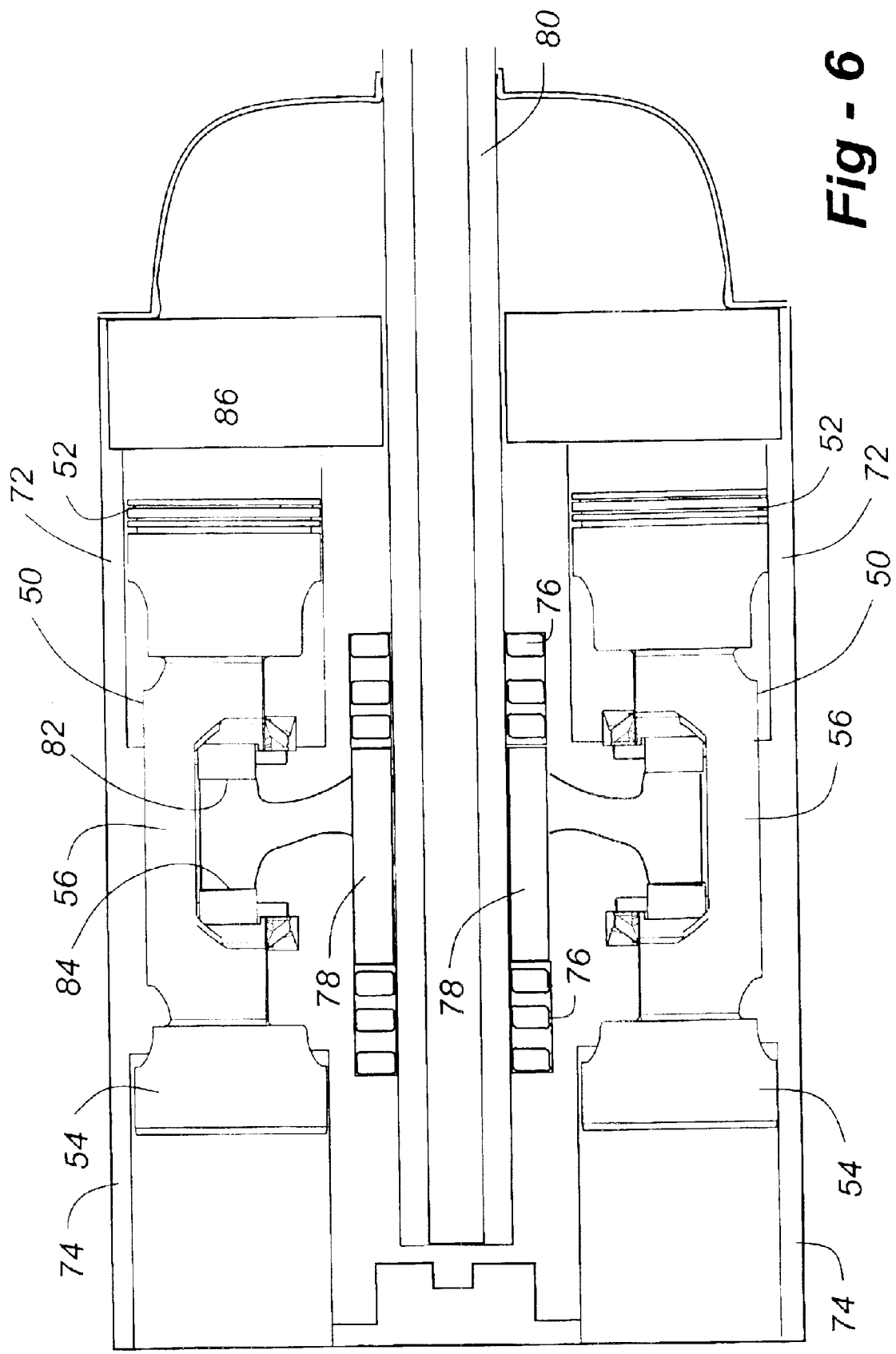
FIG. 6 is a cross-sectional view of a first embodiment of a single-ended barrel engine according to the present invention.

FIG. 6 illustrates a cross sectional view of a single-ended barrel engine 70 which employs the modified double-ended, double roller piston 50 illustrated in FIG. 3. The modified double-ended, double roller pistons 50 can be seen with the combustion end 52 in a combustion cylinder 72 and the guide end 54 in a guide cylinder 74. FIG. 4 also illustrates an example of a variable compression ratio device 76, with portions disposed below and above the track 78. In this arrangement, the track 78 has been splined or attached by other means to the central power shaft 80, such that the track 78 is axially slidable along the power shaft 80 while still rotating in unison with the power shaft. It may also be desirable to lock or fuse the track to the central power shaft such that both the track and the power shaft are axially slidable within the supports for the power shaft. The latter design in which the power shaft and track are axially slidable as a single unit can help to prevent side-loading of the piston rollers by preventing spline tolerances from becoming exaggerated at the outermost ends of the track.

In order to raise compression ratio, the lower portion of the variable compression ratio device 76 is expanded while the upper portion of the device is simultaneously compacted, causing the track 78, along with all of the pistons 50, to move towards the closed ends of the combustion cylinders 72. In some engine configurations, it may only be necessary to provide a single lower portion of the variable compression ratio device. As the pistons are moved closer to the head of the engine, their top dead center clearance volume (the volume between the upper end of the combustion cylinder 72 and the combustion end 52 of the piston at top dead center) is reduced, thereby raising the engine's compression ratio. In order to lower the engine's compression ratio, the lower portion of the variable compression ratio device 76 is compacted while the upper portion of the device is simultaneously expanded, causing the track 78, along with all of the pistons, to move away from the closed end of the combustion cylinders 72. This increases the top dead center clearance volume, thereby lowering the engine's compression ratio.

As shown, the upper and lower rollers 58 and 60 of the pistons 50 are in mechanical communication with the track 78 such that as the track rotates, the pistons are urged upwardly and downwardly in the cylinders 72 and 74. The track 78 may be said to have an upper cam surface 82 and a lower cam surface 84 which are engaged by the rollers of the pistons 50.

It should be noted that FIG. 6 illustrates the engine 70 without an intake system for introducing a mixture of air and/or fuel to the combustion chamber, defined between the combustion end 52 of the piston 50 and the closed upper end of the cylinder 72. Instead, a cylinder head 86 is shown as a block. The present invention may be practiced with any type of intake system operable to introduce a mixture of air and/or fuel into the combustion cylinder. This may include poppet-style valves in the head, ports in the head, or sidewalls of the cylinder, or any other approach known to those of skill in the art. Likewise, any type of valve actuation mechanism may be used. The upper end of the combustion cylinder 72 is defined as "closed" herein since compression occurs therein, despite the fact that valves or ports may be provided which selectively open the upper end of the combustion cylinder 72 to allow the introduction or exhausting of gases from the cylinders.

The lower end of the engine 80 is shown as being open to the guide cylinders 74. Preferably, an engine cover is provided so as to avoid the introduction of dirt or debris to the guide cylinder 74. It should also be appreciated that an oiling system will be provided so as to lubricate the engine.

As will be clear to those of skill in the art, other approaches to longitudinally moving the track 78 and/or power shaft 80 with respect to the combustion cylinder 72 may be used, including any approach currently known to those of skill in the art, or yet to be developed. Variable compression ratio devices such as disclosed in co-pending U.S. patent application Ser. No. 10/021,192 may also be used herein.

As discussed in the background, variable compression ratio is especially beneficial when used in combination with supercharging, where the combination of variable compression ratio and supercharging substantially multiplies the benefits of both features. In U.S. patent application Ser. No. 10/263,264, which is incorporated herein, the guide end of a double-ended, double roller piston has been modified to compress boost air in a single-ended barrel engine. This integral supercharger design retains the critical crosshead qualities of a double-ended, double roller piston design while using the guide end of the piston for useful work. In this case, the guide end of the piston may be referred to as a pumping end and the guide cylinder may be referred to as a pumping cylinder.

Figure 7:
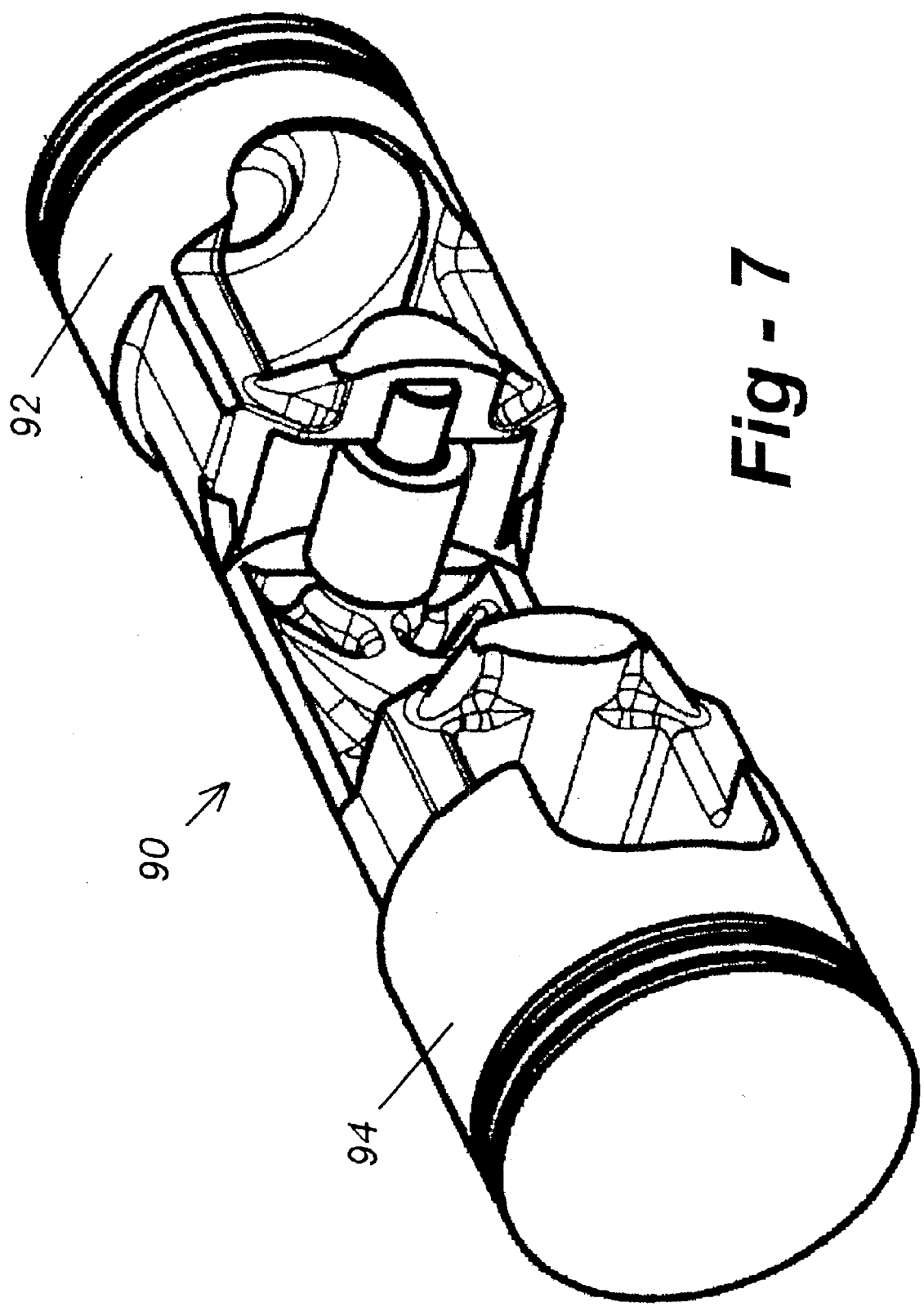
FIG. 7 is a perspective view of a second embodiment of a double-ended piston for use with the present invention.

FIG. 7 illustrates a double-ended, double roller piston 90 for use in the embodiment of the present invention with an integral supercharger. The piston 90 has a combustion end 92, a pumping end 94, and a midportion 96 extending therebetween and interconnecting the combustion end and pumping end. The piston 90 may be assembled into a barrel engine, according to the present invention, wherein the guide cylinders have closed outer ends so that the pumping end 94 and pumping cylinder cooperate to compress air. This compressed air, in turn, may be routed to the intake system for the combustion end of the engine, so as to supercharge the engine. In alternative configurations, the pumping cylinder may be used to compress air for other applications or to compress other types of gases.

Figure 8:
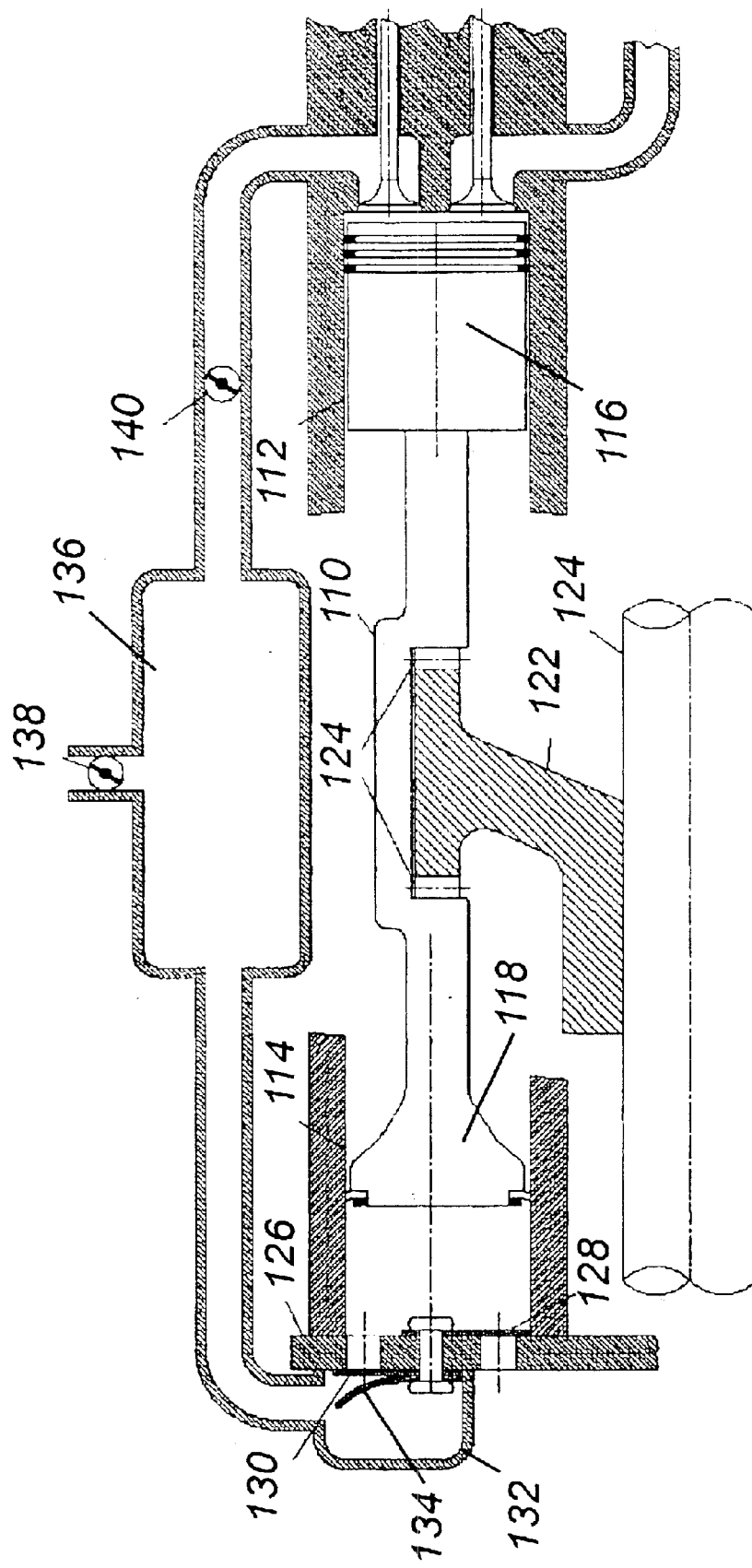
FIG. 8 is a cross-sectional view of a second embodiment of a barrel engine according to the present invention.

FIG. 8 schematically illustrates an alternative embodiment of a barrel engine, according to the present invention, utilizing a double-ended piston with a combustion end and a pumping end. FIG. 8 illustrates an alternative piston design, though the design of FIG. 7 is preferred. Referring to FIG. 8, a reciprocating piston assembly 110 is assembled within two co-axial cylinder bores, a combustion cylinder 112 and an air compression or pumping cylinder 114. The piston 110 includes a combustion end 116 in the combustion cylinder 112 and a pumping end 118 in the pumping cylinder 114. The ends are interconnected by a midportion 120. The ends 116 and 118 and the midportion 120 may be formed as a single piece, or may be formed of multiple pieces. The midportion 120 of the piston is connected to a rotating track 122 via rollers 124. The track 122 is connected to a power shaft 124 such that the track 122 and shaft 124 rotate in unison about the axis of the shaft. The track 122 has undulating upper and/or lower cam surfaces such that as the track rotates, the upper and/or lower surfaces move toward and away from the open ends of the cylinders. As will be clear to those of skill in the art, the portion of the track between the cylinders will undulate toward one of the cylinders as it undulates away from the other. As the track rotates, the ends 116 and 118 are urged upwardly and downwardly in their cylinders 112 and 114, respectively. Consequently, combustion in the combustion cylinder 112 results in the track being urged to rotate. Provisions may be included to allow the track to be axially slidable in order to vary compression ratio.

As shown, the outer end of the combustion cylinder 112 is closed off by a head with traditional poppet style valves for supplying an intake air or an intake mixture to a combustion chamber defined in the combustion cylinder 112 between the combustion end of the piston and the head. The "intake system" may include one or more intake valves for controlling intake flow as well as one or more fuel injectors. In whatever configuration, the intake system is operable to introduce a combustible mixture to the combustion chamber, whether the combustible mixture is premixed prior to introduction to the chamber, or whether the mixture is created within the chamber. One or more traditional poppet style exhaust valves are also provided for exhausting combustion products from the combustion chamber. Other types of valves may be provided for controlling the flow of intake and exhaust to and from the combustion chamber, including, but not limited to, two-stroke style ports and rotary valves.

The combustion end of the engine may be used for two stroke or four stroke stoichiometric spark-ignition, lean combustion spark-ignition, diesel or homogenous charge compression ignition combustion strategies. Additionally, the engine may consist of multiple combustion and pumping cylinders. In one preferred embodiment, the combustion end provides a four-stroke spark ignition combustion strategy, with increased power density and efficiency due to the supercharging effect of the compression features of the engine. At the other "end" of the engine, a pumping or compression chamber is defined within the pumping cylinder 114 between the pumping end 118 of the piston and a valve plate 126 which acts as a "head" for the compression chamber. As will be clear to those of skill in the art, as the track undulates and ends of the piston move upwardly and downwardly in their respective cylinders, the chambers expand and contract.

In the illustrated embodiment, the valve-plate 126 has reed/flapper valves for intake 128 and exhaust 130 of air or gas for the pumping cylinder 114. As shown, a flapper valve 130 covers an exhaust passage through the valve plate 126, which communicates with the compression chamber. The flapper valve 130 is preferably biased to a position wherein it covers and seals the passages. As will be clear to those of skill in the art, the exhaust flapper valve 130 is on the "outside" of the valve plate 126 so that the exhaust flapper valve rests against the surface opposite the piston 120. An intake flapper valve 128 covers an intake passage through the valve plate 126. The intake flapper valve 128 is biased to a position where it covers and seals the intake passage. The intake flapper valve is positioned on the "inside" of the valve plate 126 so that it is facing the piston and may be considered to be "inside" the compression chamber. The intake flapper valve and the exhaust flapper valve each act as one way flow valves, with the intake flapper valve allowing one way flow into the chamber and the exhaust flapper valve allowing one way flow out of the chamber. As shown, the valve plate is preferably a flat or substantially flat plate, which minimizes the volume of the compression chamber and simplifies production of the valve assembly. However, the valve plate may alternatively be domed, slanted, or otherwise shaped for some applications. Also, while the flapper valves are preferably parallel to the valve plate in their closed positions, they may also be slanted or positioned differently than shown.

As will be clear to those of skill in the art, the portion of the engine illustrated in FIG. 8 preferably is replicated concentrically about the shaft 124 such that multiple combustion and pumping cylinders are provided. A circular outer plenum 132, concentric with the shaft 124, preferably connects the output of boosted air from all air compression chambers as regulated by exhaust reed valves. A similar concentric plenum for ambient intake air is preferably provided inboard of the exhaust plenum. Air is ducted to this intake plenum from the engine air intake and filtration system.

As the reciprocating piston 110 moves to enlarge the volume of the air in the pumping chamber, the reduced pressure within the chamber acts to open the intake reed valve 128 and air is received from the intake air plenum. That is, as the volume in the chamber is expanded, a vacuum is formed and the relative pressure outside the engine (typically ambient pressure) acts to press against the intake flapper valve until the bias of the flapper valve, which retains it a closed position, is overcome and it flexes away from the passage. At this point air can flow through the passage into the compression chamber. The bias of the exhaust reed valve 130 together with the relatively high boost air pressure in the exhaust plenum keeps the exhaust passage sealed off during this process. As the piston assembly 110 moves to reduce the volume in the compression chamber, the increased pressure within the chamber allows the intake reed valve 128 to return to its closed position. When the pressure within the cylinder 114 increases to a point sufficiently above the pressure in the plenum 132, the bias of the exhaust reed valve is overcome and it is urged open so the compressed air in the chamber is expelled to the plenum 132. A valve "backer" 134 may be included to provide structural support to the exhaust valve 130 during the opening period.

The compressed or boost air is ducted from the plenum 132 to an intake plenum 136 for the combustion cylinders. Alternatively, compressed air from individual compression chambers may be brought into individual combustion chambers, rather than the shared plenum. The same may be true for the intake to the compression chambers. As shown schematically in FIG. 8, the boost air pressure is preferably controlled by a wastegate mechanism 138 operable to vent to the atmosphere. A throttle 140 is preferably provided downstream of the wastegate 138. Another throttle may be included prior to the compressor inlet (not shown) depending upon the control strategy desired. A throttle prior to the compressor inlet, or controlling the flow of air to the intake plenum, could effectively turn off the compression stage of the engine or throttle it back. This allows the compression to effectively be turned on and off. Alternatively, the waste gate may be used. As yet another alternative, a disabling feature may be used for disabling the compressor feature. An example is an opening device that presses either the intake or exhaust flapper valve open and holds it in this position so that the piston is not effective at compressing air. This disabling device, commonly called a valve unloader, may consist of rods or fingers which hold the flapper valves open or closed or may be of the sliding leaf type used in MeritorWabco® compressors. Common practice in reciprocating compressors such as the one in this engine is to unload the suction or intake valve of the compressor, although it may also be beneficial to unload the exhaust valve instead of the intake or in combination with the intake to further minimize unloaded pumping losses.

The present invention provides numerous benefits over a typical single ended barrel engine design. Boost air is available to the combustion process in a more compact package than by more traditional means such as add-on turbochargers or superchargers. Because the compressor is an integral part of the design of the engine, the cost is potentially reduced as well. Boost air is created through the use of proven technology; involving reciprocating pistons and reed valves as opposed to precision high-speed turbine machinery. A small amount of piston inertial force is counteracted by the compression of the boost air. This results in some reduction of contact force on the piston rollers. The availability of boost air increases the flexibility of the barrel engine to include both 2-stroke and 4-stroke engine cycles. Without boost, a barrel engine has little ability to provide a fresh air charge to the cylinder during the intake process. This is particularly important in 2-stroke cycles where the pressure differential between bore and manifold (or crankcase) is limited. Typically, unboosted 2-stroke engines are crankcase scavenged for this reason. Crankcase scavenging is not practical for barrel engine configurations. This invention provides a relatively simple way to add boost to the barrel engine and add viability as a 2-stroke machine. Boost air can be used in both 2-stroke and 4-stroke cycles to enhance power density. This feature can be utilized to achieve higher power ratings, or to reduce bore and stroke. Reducing bore and stroke for a barrel engine can be very beneficial in reducing piston speeds and resulting accelerations, and also in reducing reciprocating mass. Both of these topics are important due to the internal stresses placed on the reciprocating components and the cam roller interface when high inertial forces are present.

The present method of creating boost is unique to a single ended barrel engine construction. Because the combustion cylinders are located only on one end of the engine, the ability exists to utilize the "bottom" end for air compression. Further, this arrangement maintains the ability to employ variable compression ratio mechanisms that are simpler and less complicated than might be used in double-ended barrel engines or on more traditional slider-crank mechanisms. The use of the "bottom" of the single-ended piston as an air compressor combines the purposes of a lower crosshead and compression piston. The availability of boost air makes it possible to achieve more power at higher altitudes than otherwise possible. This is particularly important with aerial vehicles where high service ceilings are desired.

As discussed above, an engine according to the present invention may be constructed with multiple cylinders arranged around the power shaft with the combustion cylinders all located at one end of the engine. As an alternative, alternating cylinders may be flipped end-to-end such that the combustion cylinders alternate end-to-end. Other arrangements may also be possible, such as two cylinders one direction and then two cylinders the other direction, or any other arrangement of cylinders. As would be clear to those skilled in the art, by varying the arrangement, the vibration and/or power characteristics may be altered. Also, although the combustion and compression cylinders are illustrated as being similar in diameter, they may be of slightly or substantially different diameter. For example, a compression cylinder significantly larger than the combustion cylinder may be desirable for high boost applications. The inverse may be beneficial in other applications.

As discussed previously, a single-ended barrel engine has the ability to deviate from the sinusoidal piston motion profile typical of a crank driven engine. In traditional crank-driven engines, the piston motion is unavoidably sinusoidal, as alterations from a sinusoidal shape are not possible due to the crank configuration. However, a single-ended barrel engine allows a designer to choose shapes other than a sinusoid. Certain non-sinusoidal piston motion profiles can provide significant advantages over a traditional sinusoidal piston motion profile.

Figure 10:
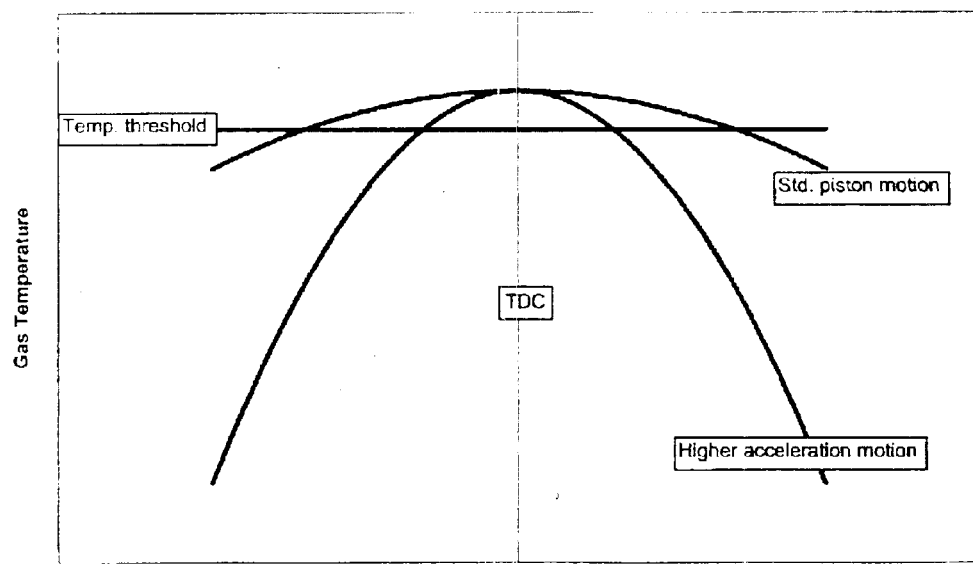
FIG. 10 is a graph comparing two piston motion profiles at top dead center.

According to one aspect of the present invention, conditions near firing top dead center are manipulated to optimize or improve ignition conditions as compared to a traditional slider crank design. In one embodiment, the conditions are manipulated to enable homogenous charge compression ignition combustion by crossing the ignition threshold at a sharper slope or rate, as compared to the rate that would occur with a traditional slider crank design. This preferably provides more consistent and robust control of the ignition point, as shown schematically in FIG. 10. FIG. 10 includes a curve for the piston motion profile near top dead center in a standard slider crank engine (labeled "std. piston motion") and a curve for the piston motion profile according to one embodiment of the present invention (labeled "higher acceleration motion"). A horizontal temperature threshold line is also provided, indicating where homogenous charge compression ignition combustion may occur. As shown, the present invention provides a profile wherein the piston crosses the threshold at a faster rate and a steeper curve. This may be used as a technology-enabler for homogenous charge compression ignition combustion by providing more consistent and robust control of the ignition point.

According to a further aspect of the present invention, the piston motion profile may include retracting the piston from top dead center on the firing stroke more quickly than would a traditional slider crank design. This quicker retraction preferably reduces the high pressure-rise rates typically experienced in homogenous charge compression ignition combustion. This same quick retraction from firing top dead center may also be used to avoid end-gas detonation in spark-ignited configurations by controlling the end-gas temperature via expansion of the bulk gas. These are only two examples of how this tailoring of firing top dead center motion may be used to control ignition and combustion processes in an engine.

By careful tailoring of the piston motion near firing TDC, trade-offs can be made between a) reducing the heat loss from the working fluid to the chamber walls and b) moving towards a more constant volume (instantaneous with respect to volume change) combustion event. This offers the prospect of improving the thermal efficiency (i.e. fuel consumption) of the engine.

According to another aspect of the present invention, breathing losses in the engine are reduced or minimized by reducing the piston velocity during the breathing strokes (intake and/or exhaust) and reducing piston reversal accelerations in these areas, as compared to a traditional slider crank design. Reducing piston reversal acceleration increases the time the piston spends near top dead center or bottom dead center, which gives more time for the valve to open or close while the piston velocity is minimal. Reducing piston velocity during the breathing strokes reduces the displacement rate and therefore the flow velocity required through the valve and/or port. A lower velocity of air requires less driving pressure difference through a given valve/port geometry and will therefore reduce pumping losses in the engine. This method can also be used to maximize volumetric efficiency.

According to yet a further aspect of the present invention, piston motion profiles may be tuned, particularly with respect to acceleration levels, such that a good balance is obtained between inertial and pressure force acting on the piston. For example, just after firing top dead center, when the gas pressure applies a highly compressive force to the piston upper piston roller 58, higher downward acceleration of the piston (as compared to a traditional slider crank design) may be used to provide an equally high tensile inertial force. The sum of these opposite forces can be substantially reduced over a range of operating conditions, thus, reducing Hertzian contact stress at the roller to cam surface interface. In the same manner, the acceleration level at breathing top dead center and at both bottom dead centers can be reduced since there are minimal offsetting pressure forces on the piston in those regions. In this way, the capabilities of the engine for maximum cylinder pressure and for maximum speed may be increased without any actual change to the components other than those necessary to achieve the desired acceleration levels. Lower piston acceleration levels (as compared to a traditional slider crank design) at bottom dead center and breathing top dead center (between the exhaust and intake strokes) are desired to reduce the net force on the midportion 56 of the piston 50 and Hertz stress on the rollers 58 and 60, as well as for improved breathing efficiency.

According to the present invention, the clearance between a piston and the upper end of its combustion chamber at top dead center (referred to as top dead center clearance) need not be the same at breathing top dead center (between the exhaust and intake strokes) and firing top dead center (between the compression and expansion strokes) events. In one embodiment, top dead center clearance at firing is set to provide a desired compression ratio, and top dead center clearance between the breathing strokes is set greater than the top dead center clearance at firing. In one example, this allows for greater valve-to-piston clearance during the valve overlap process (which occurs at or near top dead center between the exhaust and intake strokes). The increased available clearance at breathing top dead center may negate the need for valve pockets in the piston crown, known to be detrimental to both performance and structural integrity of the piston. Greater valve lifts may also be used. Also, the piston motion profile may be designed to dwell the piston near the breathing top dead center for a longer period of time (as compared to a traditional slider crank design) or a shorter period of time.

Use of a breathing top dead center clearance that is greater than the firing top dead center clearance promotes an increase in residual fraction, or the portion of the trapped cylinder charge that consists of burned gas products. Residual fraction is known to be beneficial in reducing emissions of oxides of nitrogen ($NO_x$). Therefore, the unique piston motion as made possible by the single acting, cam drive barrel engine can be a beneficial method of reducing harmful exhaust gas emissions. Increased residual fraction can also offer benefits to homogenous charge compression ignition combustion by introducing radical species into the mixture. Residual fraction can also be used in some cases to alter the ignition point in homogenous charge compression ignition engines.

Figure 9:
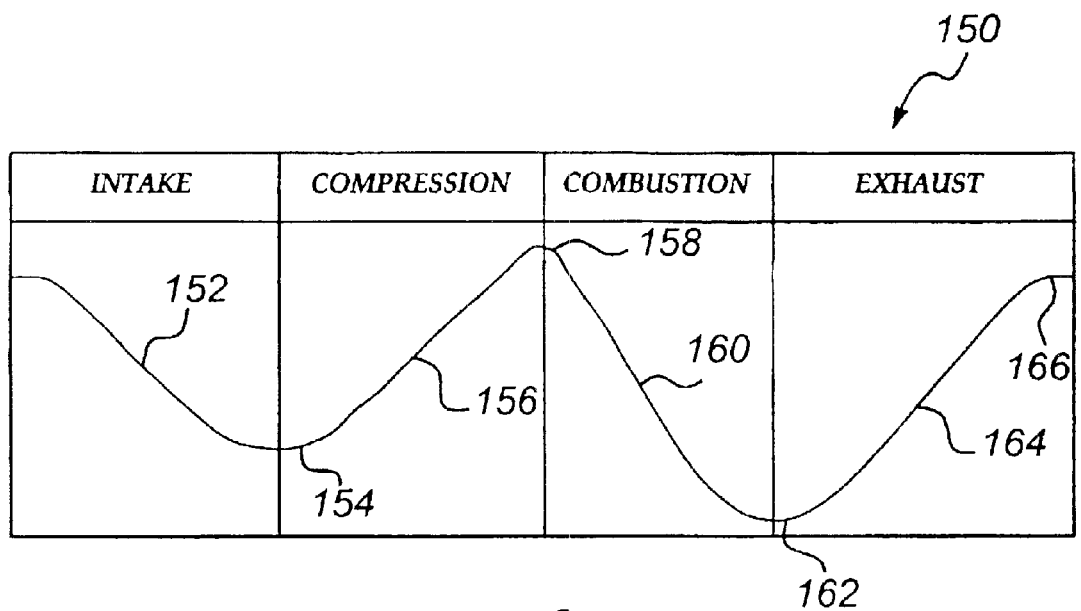
FIG. 9 is a graph showing one version of a non-sinusoidal piston motion profile for use with the present invention.

FIG. 9 illustrates one example of a piston motion profile 150 that is non-sinusoidal. The profile includes a downward intake slope 152, corresponding to piston travel away from the closed end of the combustion cylinder and expansion of the combustion chamber. The intake slope ends with a transition through "intake bottom-dead center" 154. This is followed by an upward compression slope 156, which ends with a transition through "compression top-dead center" 158. Under most conditions, combustion occurs at or near compression top-dead center 158, and the piston travels downward, as shown by combustion or expansion slope 160. The piston then transitions through "expansion bottom-dead center" 162 and begins upward movement, as indicated by the exhaust slope 164. The exhaust stroke terminates with a transition through "exhaust top-dead-center" 166, and the intake stroke 152 is repeated.

The current profile illustrates slower piston motion at intake breathing top dead center. Slower piston motion at this time will help improve volumetric efficiency, as discussed above. The profile also illustrates the piston position at breathing top dead center lower than piston position at compression/combustion top dead center. As discussed above, such a profile can be used to increase valve to piston clearance to allow higher compression ratio to be used. A slower transition between intake 152 and compression 156 is also used. This may be provided to maximize the intake charge and to reduce inertial forces on the piston and upper roller 58 at bottom dead center. The compression stroke 156 is illustrated as occurring over a longer period than the combustion stroke 160.

In the profile 150, piston motion is faster at and right after combustion top dead center. Faster piston motion at this time can be used to improve combustion in homogenous charge compression ignition or to prevent end-gas detonation in spark-ignited applications. The combustion stroke 160 is shown as having more displacement than the compression stroke 156. This is another advantage to the barrel engine. A longer expansion stroke may be used to provide a Miller cycle effect to allow more of the combustion energy to be captured and to allow a longer transition to exhaust, as shown. In a crank driven engine, the various strokes are necessarily identical in displacement, thereby limiting efficiency. The piston motion profile illustrated in FIG. 9 may be easily manufactured to best suit stoichiometric spark-ignited, lean combustion spark-ignited, homogeneous charge compression-ignited, or diesel applications.

As further embodiments of the present invention, any of the teachings herein may be combined with any of the teachings in copending U.S. patent application Ser. No. 10/021,192, which is incorporated herein. For example, the present invention may be practiced with any combustion strategy, including homogeneous-charged compression ignition, diesel, spark-ignition, or any others known to those of skill in the art, or discussed in the incorporated co-pending applications. Likewise, the present invention may be practiced with four-stroke or two-stroke engine designs, as well as other less common designs.

Also, the various aspects of the present invention may be combined in various ways depending on the application of the engine. For example, a barrel engine may be provided with a double-ended, double-roller piston and utilize a variable compression ratio device and/or integral supercharging and/or non-sinusoidal piston motion.

In addition to others known to those of skill in the art, all embodiments of the present invention may be adapted for the following combustion strategies: stoichiometric spark-ignited, lean combustion spark-ignited, homogeneous charge compression-ignited, diesel, dual-mode lean combustion spark-ignited/stoichiometric spark-ignited, dual-mode homogeneous charge compression-ignited/stoichiometric spark-ignited, dual-mode homogeneous charge compression-ignited/diesel and tri-mode homogeneous charge compression-ignited/lean combustion spark-ignited/stoichiometric spark-ignited.

Those of skill in the art will recognize that the disclosed embodiments of the present invention may be altered in various ways without departing from the scope or teaching of the present invention.

We claim:

1. An internal combustion barrel engine, comprising:
   an engine housing having a first end and a second end;
   a elongated power shaft longitudinally disposed in the engine housing and defining a longitudinal axis of the engine;
   a combustion cylinder and a guide cylinder spaced apart and disposed on a common cylinder axis that is generally parallel to the central axis, the cylinders each having an inner end and a outer end with the inner ends being closer to each other, the outer end of the combustion cylinder being closed;
   an intake system operable to introduce a mixture of air and/or fuel into the combustion cylinder;
   a track supported between the inner ends of the combustion cylinder and the guide cylinder, the track having an undulating cam surface, the track being movable such that the portion of the cam surface most directly between the inner ends of the cylinders undulates toward and away from the inner end of the combustion cylinder;
   a double-ended piston comprising:
      a combustion end movably disposed in the combustion cylinder such that a combustion chamber is defined between the combustion end of the piston and the closed end of the combustion cylinder;
      a guide end movably disposed in the guide cylinder;
      a midportion extending between the combustion end and the guide end, the midportion being in mechanical communication with the cam surface of the track such that as the track moves, the midportion urges the combustion end of the piston outwardly within the combustion cylinder to compress the mixture in the combustion chamber and allows the combustion end of the piston to move inwardly within the combustion cylinder as the mixture within the combustion chamber expands, the guide end moving with the midportion such that as the combustion end moves outwardly, the guide end moves inwardly in the guide cylinder, and as the combustion end moves inwardly, the guide end moves outwardly, the guide end and the guide cylinder cooperating to guide the motion of the double-ended piston; and
      a variable compression device operable to move the track axially towards and away from the inner end of the combustion cylinder so as to adjust the compression ratio;
   wherein combustion occurs only in the combustion cylinder and does not occur in the guide cylinder.

2. The engine according to claim 1, wherein the track is disposed generally in a plane that is perpendicular to the longitudinal axis of the engine and the cam surface is disposed at a generally constant distance from the longitudinal axis of the engine.

3. The engine according to claim 1, wherein the track is in mechanical communication with the power shaft such that the shaft and track rotate in unison with respect to the cylinders.

4. The engine according to claim 1, wherein the guide end of the piston comprises a pumping end and the guide cylinder comprises a pumping cylinder with a closed outer end, the pumping end and the pumping cylinder cooperating to compress a gas, the engine further comprising a valve assembly for providing a gas to the pumping cylinder and venting compressed gas from the pumping cylinder, and a compressed gas conduit in fluid communication with the valve assembly and the intake system such that the compressed gas from the pumping cylinder is provided to the combustion chamber so as to supercharge the engine.

5. The engine of claim 4, wherein the compressed gas conduit comprises a compression plenum in fluid communication with the valve assembly such that the compressed air from the compression cylinder flows into the compression plenum, the compression plenum being in fluid communication with the intake system such that the intake system is operable to introduce a compressed combustible mixture into the combustion cylinder.

6. The engine of claim 5, further comprising a wastegate in fluid communication with the compression plenum and selectively operable to vent compressed air from the compression plenum.

7. The engine according to claim 1, wherein the undulating cam surface is a first cam surface, the track further including a second cam surface, the first cam surfaces being generally directed toward the open end of the combustion cylinder and the second cam surface being opposed thereto and generally directed toward the guide cylinder, the midportion of the piston including a first and a second opposed roller, the first roller engaging the first cam surface and the second roller engaging the second cam surface.

8. The engine according to claim 7, wherein the combustion end, guide end, and midportion of the double ended piston are rigidly interconnected.

9. The engine according to claim 7, wherein the combustion end, guide end and midportion of the double ended piston are integrally formed.

10. An internal combustion barrel engine, comprising:

an engine housing having a first end and a second end;

a elongated power shaft longitudinally disposed in the engine housing and defining a longitudinal axis of the engine;

a combustion cylinder and a guide cylinder spaced apart and disposed on a common cylinder axis that is generally parallel to the central axis, the cylinders each having an inner end and a outer end with the inner ends being closer to each other, the outer end of the combustion cylinder being closed;

an intake system operable to introduce a mixture of air and/or fuel into the combustion cylinder;

a track supported between the inner ends of the combustion cylinder and the guide cylinder, the track having an undulating cam surface, the track being movable such that the portion of the cam surface most directly between the inner ends of the cylinders undulates toward and away from the inner end of the combustion cylinder, the undulating cam surface defining a non-sinusoidal shape; and a double-ended piston comprising:

a combustion end movably disposed in the combustion cylinder such that a combustion chamber is defined between the combustion end of the piston and the closed end of the combustion cylinder;

a guide end movably disposed in the guide cylinder;

a midportion extending between the combustion end and the guide end, the midportion being in mechanical communication with the cam surface of the track such that as the track moves, the midportion urges the combustion end of the piston outwardly within the combustion cylinder to compress the mixture in the combustion chamber and allows the combustion end of the piston to move inwardly within the combustion cylinder as the mixture within the combustion chamber expands, the motion of the piston being non-sinusoidal, the guide end moving with the midportion such that as the combustion end moves outwardly, the guide end moves inwardly in the guide cylinder, and as the combustion end moves inwardly, the guide end moves outwardly, the guide end and the guide cylinder cooperating to guide the motion of the double-ended piston;

wherein combustion occurs only in the combustion cylinder and does not occur in the guide cylinder.

11. The engine according to claim 10, wherein the cam surface includes at least one top dead center portion, the top dead center portion being linearly shorter than if the cam surface defined a sinusoidal shape.

12. The engine according to claim 10, wherein the cam surface defines at least one compression stroke and one expansion stroke, the compression stroke being slower and the expansion stroke being faster than if the cam surface defined a sinusoidal shape.

13. The engine according to claim 10, wherein the cam surface defines a combustion top dead center and a breathing top dead center, the breathing top dead center being further from the closed outer end of the combustion cylinder than the combustion top dead center is from the closed outer end of the combustion cylinder.

14. The engine according to claim 10, wherein the guide end of the piston comprises a pumping end and the guide cylinder comprises a pumping cylinder with a closed outer end, the pumping end and the pumping cylinder cooperating to compress a gas, the engine further comprising a valve assembly for providing a gas to the pumping cylinder and venting compressed gas from the pumping cylinder, and a compressed gas conduit in fluid communication with the valve assembly and the intake system such that the compressed gas from the pumping cylinder is provided to the combustion chamber so as to supercharge the engine.

15. The engine of claim 14, wherein the compressed gas conduit comprises a compression plenum in fluid communication with the valve assembly such that the compressed air from the compression cylinder flows into the compression plenum, the compression plenum being in fluid communication with the intake system such that the intake system is operable to introduce a compressed combustible mixture into the combustion cylinder.

16. The engine of claim 15, further comprising a wastegate in fluid communication with the compression plenum and selectively operable to vent compressed air from the compression plenum.

17. The engine according to claim 10, further comprising a variable compression device operable to move the track axially towards and away from the inner end of the combustion cylinder so as to adjust the compression ratio.

18. The engine according to claim 17, wherein the guide end of the piston comprises a pumping end and the guide cylinder comprises a pumping cylinder with a closed outer end, the pumping end and the pumping cylinder cooperating to compress a gas, the engine further comprising a valve assembly for providing a gas to the pumping cylinder and venting compressed gas from the pumping cylinder, and a compressed gas conduit in fluid communication with the valve assembly and the intake system such that the compressed gas from the pumping cylinder is provided to the combustion chamber so as to supercharge the engine.

19. The engine of claim 18, wherein the compressed gas conduit comprises a compression plenum in fluid communication with the valve assembly such that the compressed air from the compression cylinder flows into the compression plenum, the compression plenum being in fluid communication with the intake system such that the intake system is operable to introduce a compressed combustible mixture into the combustion cylinder.

20. The engine of claim 19, further comprising a wastegate in fluid communication with the compression plenum and selectively operable to vent compressed air from the compression plenum.

21. The engine according to claim 10, wherein the undulating cam surface is a first cam surface, the track further including a second cam surface, the first cam surfaces being generally directed toward the open end of the combustion cylinder and the second cam surface being opposed thereto and generally directed toward the guide cylinder, the midportion of the piston including a first and a second opposed roller, the first roller engaging the first cam surface and the second roller engaging the second cam surface.

22. The engine according to claim 21, wherein the combustion end, guide end, and midportion of the double ended piston are rigidly interconnected.

23. The engine according to claim 21, wherein the combustion end, guide end and midportion of the double ended piston are integrally formed.

* * * * *